United States Patent
Cayton et al.

(10) Patent No.: US 10,706,676 B2
(45) Date of Patent: *Jul. 7, 2020

(54) METHOD AND SYSTEM FOR REVEALING A PRIZE EMBEDDED IN A CANDLE

(71) Applicant: DIAMOND CANDLES, LLC, Durham, NC (US)

(72) Inventors: David Anthony Cayton, Bahama, NC (US); Brenda Lea Cayton, Bahama, NC (US); Justin Winter, Durham, NC (US)

(73) Assignee: DIAMOND CANDLES, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,912

(22) Filed: Nov. 10, 2017

(65) Prior Publication Data

US 2018/0315273 A1 Nov. 1, 2018

Related U.S. Application Data

(63) Continuation of application No. 15/080,339, filed on Mar. 24, 2016, now Pat. No. 9,830,771, which is a continuation of application No. PCT/US2015/054746, filed on Oct. 8, 2015.

(60) Provisional application No. 62/061,466, filed on Oct. 8, 2014.

(51) Int. Cl.
*G07F 17/32* (2006.01)
*C11C 5/00* (2006.01)
*G06Q 20/38* (2012.01)
*G06Q 30/02* (2012.01)

(52) U.S. Cl.
CPC ............ *G07F 17/3241* (2013.01); *C11C 5/00* (2013.01); *C11C 5/008* (2013.01); *G06Q 20/387* (2013.01); *G06Q 30/0207* (2013.01); *G07F 17/3213* (2013.01); *G07F 17/3225* (2013.01); *G07F 17/3253* (2013.01)

(58) Field of Classification Search
None
See application file for complete search history.

(56) References Cited

U.S. PATENT DOCUMENTS

| | | | | |
|---|---|---|---|---|
| 4,696,640 | A * | 9/1987 | Pitchford | F21S 13/00 431/289 |
| 5,879,153 | A * | 3/1999 | Slejertin | C11C 5/008 362/161 |
| 6,511,313 | B1 * | 1/2003 | Livne | C11C 5/006 362/161 |
| 2008/0108034 | A1 * | 5/2008 | Tam | G09B 7/02 434/322 |
| 2009/0089185 | A1 * | 4/2009 | Noures | G06Q 10/08 705/26.1 |

(Continued)

*Primary Examiner* — Jason T Yen
(74) *Attorney, Agent, or Firm* — Polsinelli PC

(57) ABSTRACT

A candle with an embedded item and methods for manufacturing same are disclosed. A method for manufacturing a candle having an embedded item can include a prize and a redeemable code. The redeemable code can be associated with a value. The value can be used to select a prize based on the associated value. A method, system and non-transitory computer-readable medium for revealing a value associated with the prize and redeemable code is also disclosed.

28 Claims, 8 Drawing Sheets

(56) References Cited

U.S. PATENT DOCUMENTS

2013/0209945 A1\* 8/2013 Cayton .................. B29C 39/10
431/289

\* cited by examiner

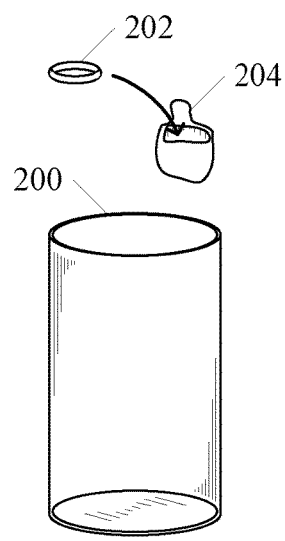 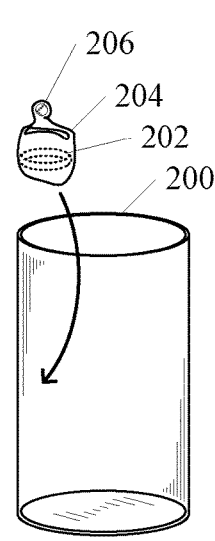 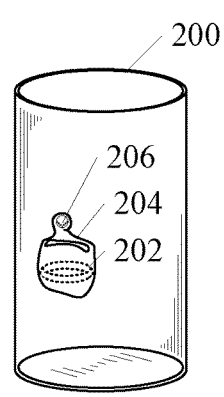 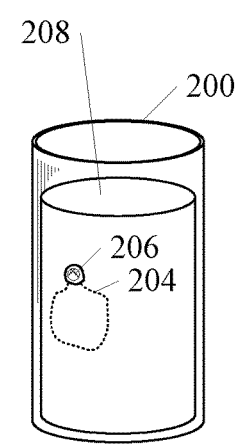
FIG. 2A    FIG. 2B    FIG. 2C    FIG. 2D
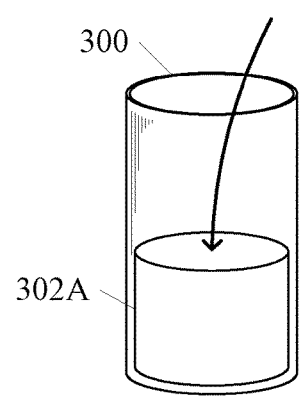 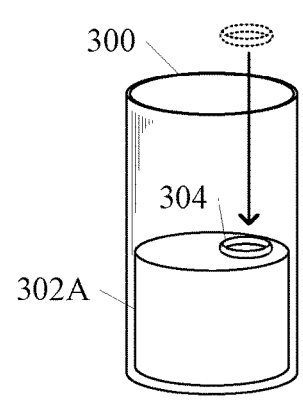 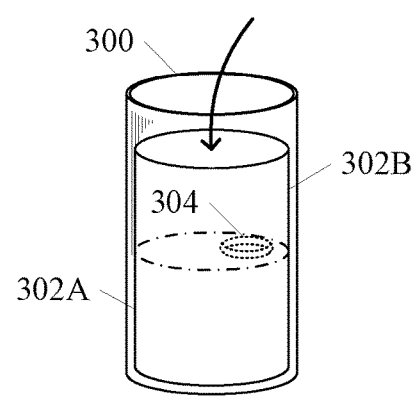
FIG. 3A    FIG. 3B    FIG. 3C

METHOD AND SYSTEM FOR REVEALING A PRIZE EMBEDDED IN A CANDLE

PRIORITY CLAIM

This application is a continuation of U.S. Non-Provisional application Ser. No. 15/080,339, filed Mar. 24, 2016, entitled, "METHOD AND SYSTEM FOR REVEALING A PRIZE EMBEDDED IN A CANDLE", which is a continuation of PCT Application Serial No. PCT/US2015/054746, filed Oct. 8, 2015, which claims the benefit of U.S. Provisional Patent Application Ser. No. 62/061,466, filed Oct. 8, 2014, entitled, "Method for Revealing a Prize," which is incorporated herein by reference in its entirety.

TECHNICAL FIELD

The subject matter described herein relates to candles with items embedded within, methods for manufacturing the same, and methods for revealing a prize contained therein.

BACKGROUND

People like to give and receive presents. In some cultures it is customary to wrap a gift present in an attractive package which is pleasing to the eye of the recipient and which also prevents the recipient from immediately knowing the nature or value of the present, which peaks the interest of the recipient, increases the recipient's anticipation of the unwrapping of the gift, and increases the recipient's delight and enjoyment of the gift revealed.

Candles are popular gifts due to their pleasant form, color, and/or scent. A burning candle provides a warm, relaxing atmosphere, and candles are associated with love, romance, or special occasions. Candle bodies are typically made of an opaque or translucent material, such as wax, which is consumed while the candle burns.

Candle bodies thus make an ideal container within which to hide an item, such as jewelry, gifts traditionally given on romantic or special occasions, or other items, where the presence, nature, or value of the item is slowly revealed as the candle body is consumed, to the delight of the recipient of the candle. In addition, the excitement of anticipation one feels while waiting to find out the nature or value of a gift received may be heightened when the recipient of a candle containing an embedded item knows beforehand that there is a possibility that the value of the embedded item can be larger, and sometimes much larger, than the purchase price of the candle within which the item is embedded.

Thus, there is a need for candles with items embedded within them where the presence, nature, or value of the embedded item is obscured by the candle body and therefore unknown to the purchaser or user of the candle until the candle body has been consumed sufficiently to reveal the presence, nature, or value of the item.

SUMMARY

According to one aspect, the subject matter described herein includes a method for manufacturing a candle having an item embedded within. In some embodiments, the method can comprise providing a first set of items, each item having a first value, providing a second set of items, each item having a second value different from the first value, combining the first and second sets of items to create a third set of items, and distributing the items of the third set among a set of candles, wherein each candle of the set of candles comprises an enclosure that forms a periphery of the candle, wax that forms a body of the candle, and a wick. One item from the third set can be enclosed within a first container that is embedded within the wax of the candle body, wherein the first container can be attached to the inside of the enclosure that forms a periphery of the candle such that the presence of the first container is visible through the enclosure but the nature of the embedded item from the third set, the value of the embedded item from the third set, or the value of the embedded item from the third set relative to a purchase price of the candle is not discernable while the item from the third set is embedded in the candle.

According to another aspect, the subject matter described herein includes a candle with an embedded item. The candle includes a candle body including wax and a wick, where the candle body includes an embedded item such that the presence, nature, and/or value of the item is obscured by the candle body.

According to another aspect, the subject matter described herein includes a candle with an embedded item. The embedded item can in some embodiments comprise an object that is redeemable for a prize. The embedded item can in some embodiments comprise an object of value such as a ring for example and an object that is redeemable for a prize of greater value. The object that is redeemable for a prize can comprise a token that may be exchanged for the prize. The object that is redeemable for a prize can display a prize identifier for identifying the prize, the type of prize, or the value of the prize. The prize identifier can comprise one or more characters. In some aspects, the object that is redeemable for a prize can be redeemable by submitting the prize identifier to a first party. The first party, in response to receiving the prize identifier, can provide the identified prize. In some aspects, the object that is redeemable for a prize can be redeemable by entering the prize identifier (e.g., a random code or numerical indicator) into a web page that transmits the prize identifier to the first party. The object that is redeemable for a prize can be redeemable by transmitting the prize identifier to the first party via a letter, an email, a text message, or a telephone call.

As used herein, the term "wax" refers to substances that can be used to form a candle body and which are consumed, usually as fuel, while the candle burns. Examples include, but are not limited to, animal fats or waxes, such as tallow, insect waxes, such as bee's wax, plant waxes and fats, such as soy-based products, and petroleum-based substances, such as paraffin.

As used herein, the term "wick" refers to any object which holds the flame of a candle. Examples include, but are not limited to, string, cord, wood, or other objects that draw the liquid fuel to the flame, usually via capillary action.

According to yet another aspect, the subject matter described herein includes a method for manufacturing a candle that contains an item whose presence, nature, and/or value is obscured from the buyer. The method includes attaching an item to the inside of a container, and filling the container with wax such that the wax obscures the nature or value of the item.

According to yet another aspect, the subject matter described herein includes another method for manufacturing a candle that contains an item whose presence, nature, or value is obscured from the buyer. The method includes adding a first amount of wax to a container or mold, allowing the first amount wax to harden sufficiently enough to support an item that is placed on the surface of the wax, placing the item on the surface of the wax; and adding into the container a second amount of wax at least sufficient to obscure the presence, nature, or value of the item.

According to yet another aspect, the subject matter described herein includes a method for revealing a prize comprising embedding, in a candle, a token, wherein the token includes a redeemable code; receiving, at a server, the redeemable code; determining, at the server, a value associated with the redeemable code, wherein the value is monetary; and transmitting, from the server, the value associated with the redeemable code. The method further includes, receiving, at the server, a digital media item and providing access, from the server, to the digital media item to an online community.

According to yet another aspect, the subject matter described herein further includes the digital media item is a digital photograph; the digital media item is a digital video; the determining further comprising, transmitting, from the server, a spinner, wherein the spinner randomly alternates between a plurality of values associated with the redeemable code, receiving, at the server, a selection of an item of jewelry equal to the value associated with the redeemable code; the item of jewelry is a ring; the selection is a size of the ring; the selection is a style of the ring; candle also included an embedded prize; and the embedded prize is a ring.

According to yet another aspect, the subject matter described herein includes a computing system comprising, a processor, a database communicatively coupled to the processor, and a memory coupled to the processor to store computer-readable instructions, which when executed cause the processor to receive data representative of a candle-embedded code; provide the data representative of the candle-embedded code to the database at least partially in response to receipt of the data from the client device; and receive data representative of a value of a prize corresponding to the code. The computing system further includes the represented prize value is the value of a prize embedded in the candle; the represented prize value is the value of a claimable prize separate from the candle; and the processor to determine parameters of a video to be recorded corresponding with the represented value of the prize.

BRIEF DESCRIPTION OF THE DRAWINGS

Preferred embodiments of the subject matter described herein will now be explained with reference to the accompanying drawings, wherein like reference numerals represent like parts, of which:

FIGS. 2A through 2D illustrates an example method for manufacturing a candle having an item embedded within according to an embodiment of the subject matter described herein;

FIGS. 3A through 3C illustrates an example method for manufacturing a candle having an item embedded within according to an embodiment of the subject matter described herein;

DETAILED DESCRIPTION

The subject matter described herein includes a candle having an embedded item within and methods for manufacturing and selling same. Example embedded items include, but are not limited to, jewelry, such as rings, earrings, and chains, precious or semiprecious stones, pearls, etc. Alternatively, or in addition, in some embodiments example embedded items include, but are not limited to, tokens or redeemable objects that can be redeemed in exchange for jewelry, such as rings, earrings, and chains, precious or semiprecious stones, pearls, etc. As an example, a method for manufacturing a candle having a ring embedded or token for a ring within is disclosed.

Figure 1:
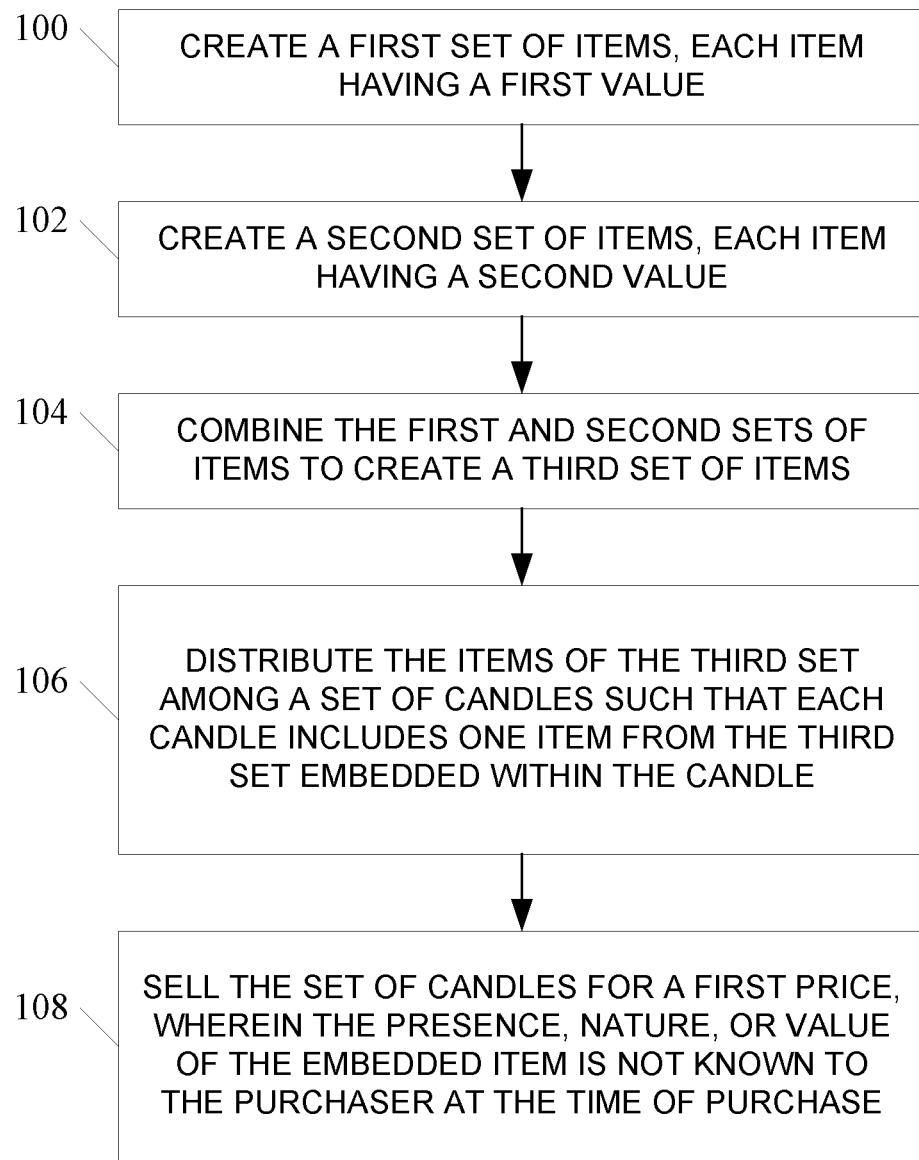
FIG. 1 illustrates an example method for manufacturing a candle that contains an item according to one embodiment of the subject matter described herein.

FIG. 1 shows a method for making a candle that contains an item according to one embodiment of the subject matter described herein. At step 100, a first set of items, each having a first value, is created. For example, a set of rings, each ring worth $10, can be collected and optionally prepared for embedding within the finished product candles. At step 102, a second set of items, each having a second value, is created. For example, a set of rings, each ring worth $100, can be collected and optionally prepared for use. Other sets of rings can be collected, each additional set having rings each worth another value, such as $1,000 per ring, $5,000 per ring, and so on. The values used above are for illustration only and are not limiting. All items in a set need not be the same. For example, a set of items can include different types of items, such as rings, earrings, pins, etc., but having the same or very similar relative value. Moreover, items in one set need not be the same as items in another set. For example, the first set of items could be rings and earrings while the second set of items could be bracelets and necklaces.

At step 104, the sets of rings are combined. At step 106, the combined set of items is distributed among a set of candles such that each candle includes one item from the combined set embedded within the candle. Optionally, in some embodiments, in step 108 the candles can be sold for a first price, where the value of the embedded item is not known to the purchaser at the time of purchase. In one embodiment, the value of the item cannot be determined by the purchaser of the candle until the candle has been burned or the wax melted to expose the item (or allow the item to be removed and unwrapped if the item has been encased in a pouch, bag, or protective wrapping). In one embodiment, the purchaser knows that a candle might contain an embedded item but cannot determine at the time of purchase whether the candle does or does not contain the embedded item.

Referring again to FIG. 1, in some embodiments at step 100, a first set of items, each having a first value, is created. For example, a set of rings, each ring worth $10, can be collected and optionally prepared for embedding within the finished product candles. Then, in some embodiments at step 102, a second set of items, each having a second value, is created. For example, tokens, vouchers or redeemable objects (referred to collectively as redeemable objects) for a set of rings, each ring worth $100, can be collected and optionally prepared for use. Other sets of tokens, vouchers or redeemable objects for rings can be collected, each additional set of tokens, vouchers or redeemable objects being redeemable for rings each worth another value, such as $1,000 per ring, $5,000 per ring, and so on. The values used above are for illustration only and are not limiting. All items, tokens, vouchers or redeemable objects in a set need not be the same. For example, a set of items can include different types of items, such as rings, earrings, pins, etc., but having the same or very similar relative value. Moreover, items or redeemable objects in one set need not be the same as items in another set. For example, the first set of items could be rings and earrings while the second set of items could be bracelets and necklaces, or redeemable objects for the same.

In some embodiments, at step 104, the sets of rings and redeemable objects are combined. At step 106, the combined set of items is distributed among a set of candles such that each candle includes one item from the combined set embedded within the candle. Thus, in some aspects a candle can have embedded therein an item from the first set of items, e.g. a ring, having a first value, or an item from the second set of items, e.g. a redeemable object for a ring of a second value. Alternatively, in some embodiments at step 106 the combined set of items is distributed among a set of candles such that each candle includes one item from the first set of items, e.g. a ring of a first value, and one item from the second set of items, e.g. a redeemable object for a ring of a second value.

Thus, in some embodiments, a candle can have a ring with a first value, or a ring with a second value, or a ring with a first value plus a redeemable object for a ring of a second value, or a ring with a second value plus a redeemable object for a ring of a first value. In some embodiments, a candle can have a ring of a first value, or a redeemable object that is redeemable for a ring of a second value. In some embodiments, the ring of the first value is a value less than the purchase price of the candle, and the redeemable object for a ring of a second value has a value greater than, in some instances significantly greater than, the purchase price of the candle. In some embodiments, a candle can have a redeemable object redeemable for a ring of a first value, or a redeemable object that is redeemable for a ring of a second value. In some embodiments, the ring of the first value is a value less than the purchase price of the candle, and the redeemable object for a ring of a second value has a value greater than, in some instances significantly greater than, the purchase price of the candle.

Optionally, in some embodiments, in step 108 the candles can be sold for a first price, where the value of the embedded item(s) is not known to the purchaser at the time of purchase. In one embodiment, the value of the item(s) cannot be determined by the purchaser of the candle until the candle has been burned or the wax melted to expose the item (or allow the item to be removed and unwrapped if the item has been encased in a pouch, bag, or protective wrapping.) In one embodiment, the purchaser knows that a candle might contain an embedded item, and/or a redeemable object that is redeemable for an item of value, but cannot determine at the time of purchase whether the candle does or does not contain the embedded item(s).

FIGS. 2A through 2D illustrate an example method of manufacturing a candle having an item embedded within according to one embodiment of the subject matter described herein. In FIG. 2A, an enclosure or container 200 is provided. In one embodiment, enclosure or container 200 can be intended to contain the finished product, and can be made of glass, plastic, or other material, and can be transparent, translucent, opaque, or some combination. Alternatively, enclosure, enclosure or container 200 may not be intended to contain the finished product, e.g., the container can be a mold that is used (and possibly reused) during manufacture and is not a part of the finished product.

An item 202, such as a ring, jewelry, prize, redeemable object or other item, is placed into a pouch 204 or other item container. In FIG. 2B, adhesive 206 can in some embodiments be applied to the pouch 204 containing item 202, and pouch 204 can be attached to the inside wall of candle enclosure or container 200, such that the pouch is affixed to the inside of the candle container, as shown in FIG. 2C. Wax 208 can then be poured into candle enclosure or container 200, covering the pouch 204 and obscuring the item 202 from view, resulting in the product shown in FIG. 2D. In one embodiment, a wick can be placed or affixed within container 200 prior to adding wax 208. Alternatively, a wick can be inserted into wax 208 after it has been poured into enclosure or container 200.

For example, in one embodiment, rings of different values are placed into small plastic bags, and in some embodiments each small plastic bag can be wrapped in gold foil or the like. Alternatively, in one embodiment, rings and/or redeemable objects of different values are placed into small plastic bags, and in some embodiments each small plastic bag can be wrapped in gold foil or the like. For each ring and/or redeemable object wrapped in plastic and gold foil, a small gold foil indicator is glued to the gold foil that contains the ring and bag. The small gold foil indicator is glued to the inside of the glass container, which allows the customer to see the location of the ring and/or redeemable object within the container. The small gold foil indicator is visible through the glass container. Wax is poured into the glass container and a wick is installed into the wet wax. In one embodiment, the wax is soy wax. The wax cools or is cooled, and labels are applied to the glass container and/or the wax. In one embodiment, the item can be affixed in more than one place to the container prior to filling the container with wax. In one embodiment, the process can include applying labels or decorations to the inside or outside of enclosure or container 200 prior to adding wax 208. For example, the process can include applying a safety label to the bottom of a glass container that will contain the candle wax.

FIGS. 3A through 3D illustrate an example method of manufacturing a candle having an item embedded within, in which the candle can be partially constructed and the item introduced or placed into the candle before construction of the candle is completed. In FIG. 3A, for example, a candle mold or container 300 can be partially filled with wax 302A, which is allowed to harden until it is firm enough to support the item 304 (e.g. ring and/or redeemable object) in the desired location within the candle body. In FIG. 3B, item 304 is placed onto or into the firm wax 302A at or near the desired location within the candle body, and in FIG. 3C, additional wax 302B is placed into mold 300. The amount of additional wax 302B is sufficient to at least cover and obscure item 304 and can partially or completely fill container 300. In one embodiment, a wick is then inserted into wax 302A and 302B. In an alternative embodiment, the wick is placed within container 300 prior to adding wax 302A and/or wax 302B.

The subject matter described herein also includes a candle with an item embedded within, such as are shown in FIGS. 2D and 3C. In one embodiment, the item can be a ring, other types of jewelry, other types of prizes, a redeemable object that is redeemable for jewelry or other object, or other item. In one embodiment, the candle is designed such that the existence, nature, or value of the embedded item and/or redeemable object cannot be determined without burning the candle or otherwise melting the wax so that the item is exposed to view.

In one embodiment, a purchaser or recipient is not aware at the time of purchase or receipt that the candle contains an embedded item at all. In one embodiment, the purchaser or recipient is aware at the time of purchase or receipt that the candle does contain an embedded item, but the candle is designed so that at the time of purchase or receipt, a purchaser or recipient of the candle does not know or cannot determine the general nature of the item, the exact nature of the item, the absolute value of the item, the price range of the item, the value of the redeemable object or the value of the object for which it can be redeemed, and/or the value of the item relative to the purchase price of the candle.

The candle can comprise wax within a shell or container, or wax not contained in a shell or container. The wax and/or container can be transparent, translucent, or opaque. For example, all or part of the container can be transparent allowing the wax to be seen, but the opacity of the wax prevents the buyer from determining the nature or value of the item embedded within. Alternatively, the wax can be translucent but the container is also translucent with the result that the nature or value of the item embedded within the wax is indiscernible. Alternatively, the nature or value of the item can be obscured by an opaque material (other than the wax of the candle) that surrounds or covers the item and where the item and the opaque covering are both embedded within the candle wax. In one embodiment, the wax and container can be transparent or translucent enough to see the item but the opaque material in which the item is wrapped obscures the nature or value of the item. In one embodiment, the item can be covered or wrapped with a material that prevents damage to the item from the heat of the candle flame as the candle wax is burned away to expose the item.

The subject matter described herein also includes a method for making a candle that contains an item such that the nature and/or value of the item is obscured from the buyer and/or recipient. In one embodiment, the value of the embedded item, or object redeemable for an item, can be less than the sale price of the candle, equal to the sale price of the candle, greater than the sale price of the candle, or much greater than the sale price of the candle. For example, a candle can be sold for $25 that contains within it a ring which can have a value of $10, $100, $1,000, or $5,000, or a redeemable object that can be redeemed for a ring which can have a value of $10, $100, $1,000, or $5,000.

Figure 4:
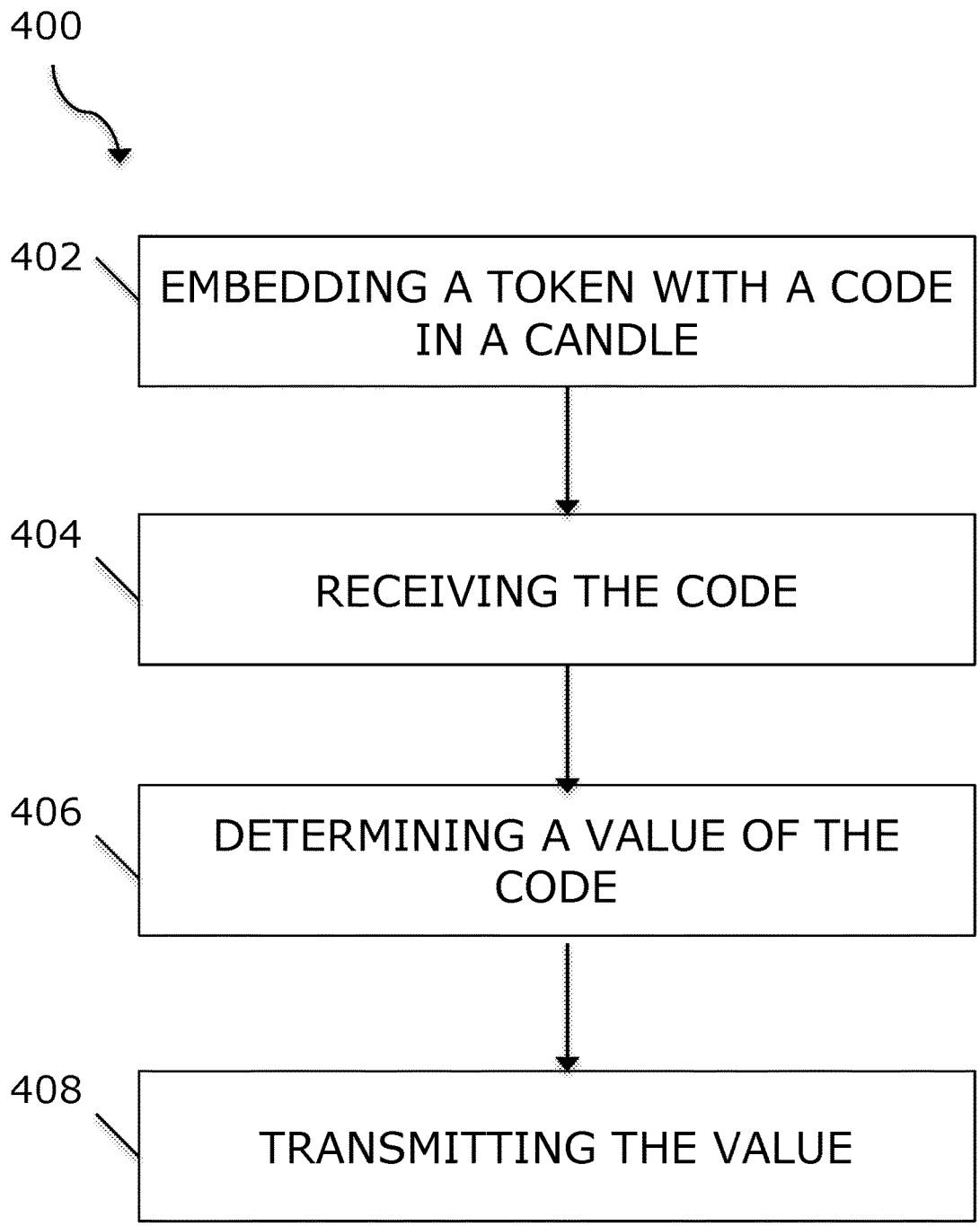
FIG. 4 illustrates an example method for revealing a prize according to an embodiment of the subject matter described herein.

The method illustrated in FIG. 4 is provided by way of example, as there are a variety of ways to carry out the method. Additionally, while the example method is illustrated with a particular order of steps, those of ordinary skill in the art will appreciate that FIG. 4 and the steps illustrated therein can be executed in any order that accomplishes the technical advantages of the present disclosure and can include fewer or more steps than illustrated.

Each step shown in FIG. 4 represents one or more processes, methods or subroutines, carried out in example method. The steps illustrated in FIG. 4 can be implemented in a system illustrated in FIG. 5. The flow chart illustrated in FIG. 4 will be described in relation to and make reference to the server 502 illustrated in FIG. 5.

FIG. 4 illustrates an example method of revealing a prize. Method 400 can begin at step 402. At step 402, a token can be embedded within a candle (e.g., as illustrated in FIGS. 2A-2D and FIGS. 3A-3C). The token can include a redeemable code (i.e., a prize identifier, as shown above). The redeemable code can be associated with a value or prize (e.g., monetary value, jewelry, ring, etc.). In some embodiments, the redeemable code can be a 12-character randomized alphanumeric code generated by a computing system. In other embodiments, the redeemable code can be any number of randomized characters. In some embodiments, the redeemable code can be a unique identifier. The redeemable code can be printed on heat-resistant material (e.g., heat-resistant paper). The heat-resistant material including the redeemable code can be included with a prize (e.g., placed into pouch 204 with item 202). In another embodiment, the redeemable code can be printed or etched on the token (e.g., a coin). In another embodiment, the redeemable code can be printed or etched on the prize (e.g., a jewelry, bracelet, ring, necklace, etc.). In another embodiment, the token (or ring, etc.) with the printed redeemable code is the only prize (e.g., placed into pouch 204). Once the token is embedded in the candle the method 400 can proceed to step 404.

Figure 5:
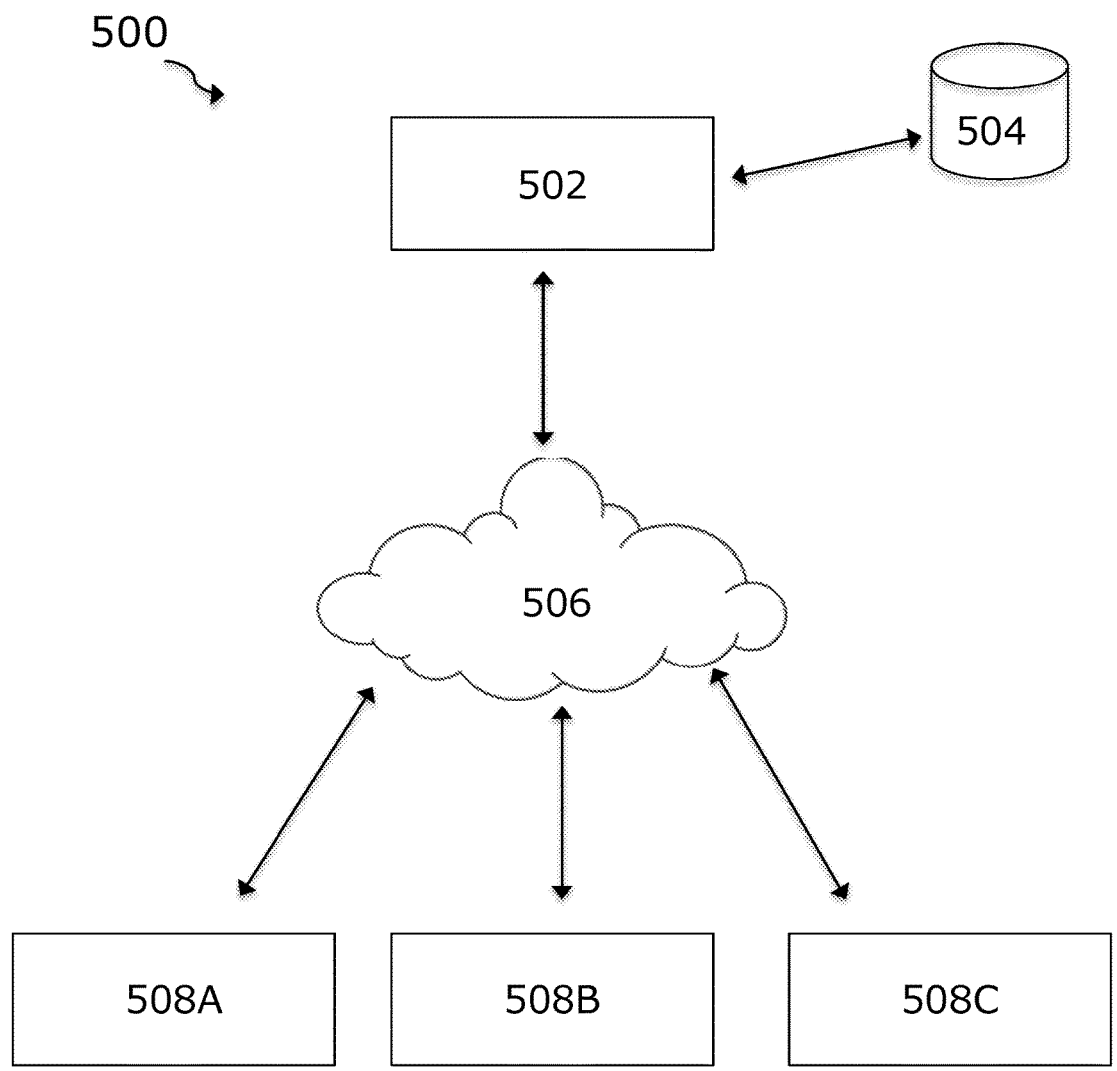
FIG. 5 illustrates an example system for revealing a prize according to an embodiment of the subject matter described herein.

At step 404, server 502 (as illustrated in FIG. 5) can receive the redeemable code. In some embodiments, server 502 can receive the redeemable code through a website (e.g., the user can enter and transmit the redeemable code at a website rendered by user device 508A-C). In other embodiments, server 502 can receive the redeemable code by short-messaging service (SMS), electronic mail (e-mail), by social media platform, by telephone, by smartphone app, or any other way server 502 can receive the redeemable code. When the redeemable code is received at the server 502 the method 400 can proceed to step 406.

At step 406, the method 400 can determine the value associated with the redeemable code. Server 502 can be commutatively coupled to database 504. Database 504 can include at least the redeemable code and the associated value. When server 502 has retrieved the value associated with the redeemable code from database 504, the method 400 can proceed to step 408.

At step 408, the method 400 can transmit the value associated with the redeemable code. For example, the value can be transmitted, from server 502, to the user at the website rendered by the user device 508A-C. In other embodiments, the value can be transmitted by short-messaging service (SMS), electronic mail (e-mail), by social media platform, by telephone, by smartphone app, or any other way of transmitting the value to the user service 508A-C. When the value associated with the redeemable code has been transmitted the method 400 can end.

In some embodiments, the value associated with the redeemable code can be monetary. For example, if the value is $500 the user can receive $500 in government currency. In other embodiments, if the value is $500 the user can receive a prize valued at $500 (e.g., a piece of jewelry appraised at $500). In other embodiments, the value can be translated into credits for the purchase goods/services from online relators (e.g., credits towards purchase of candle with embedded items).

In some embodiments, the value associated with the redeem code can be zero. For example, the value has no monetary value. In some embodiments, when the value has no monetary value the user can be provided with a coupon (e.g., discount for single purchase). The coupon can be used to purchase another candle with an embedded item (e.g., 15% off your next purchase). In some embodiments, the coupon can be an alphanumeric code. In some embodiments, the coupon can be transmitted to the user by rendering on a website, by SMS, e-mail, by social media platform, by telephone, by smartphone app, or any other way of transmitting an electronic coupon. The coupon can also be provided to the user at a later time (e.g., if the coupon is not used within a specific amount of time, the coupon can be re-transmitted).

FIG. 5 illustrates an example computing system 500 for revealing a prize. Computing system 500 can include a server 502 communicatively coupled to database 508. Server 502 can at least include one or more processors, memories, and network modules enabling the server to transmit, receive, and store data. In other embodiments server 502 can be any device that is capable of at least accepting data, transmitting data, and executing commands. In other embodiments, server 502 can be a group of servers or computing devices (e.g., web servers, application servers, network servers, etc.). Database 508 can be internal or external to server 502. Database 508 can at least include, redeemable codes, associated values, and user profiles (i.e., names, addresses, phone numbers, e-mail address, purchase history, login credentials, etc.). Server 502 and Database 508 can be communicatively coupled to network 506 (e.g., the Internet). Client devices 508A, 508B, and 508C (e.g., personal computer, laptop, smartphone, tablet, etc.) can be communicatively coupled to server 502 through network 502. A user can access server 502 (e.g., to enter a redeemable code) by client device 508A-C (e.g., by accessing a website). Server 502 can in response to receiving a redeemable code access database 504 to retrieve an associated value. Server 502 can then transmit the retrieved value to the client device 508A-C by network 506.

The methods illustrated in FIGS. 6, 7 and 8A-B are provided by way of example, as there are a variety of ways to carry out the methods. Additionally, while the example methods are illustrated with a particular order of steps, those of ordinary skill in the art will appreciate that the steps illustrated therein can be executed in any order that accomplishes the technical advantages of the present disclosure and can include fewer or more steps than illustrated.

Each step shown in FIGS. 6, 7, and 8A-B represents one or more processes, methods or subroutines, carried out in example method. The steps illustrated in FIGS. 6, 7, and 8A-B can be implemented in a system illustrated in FIG. 5.

Figure 6:
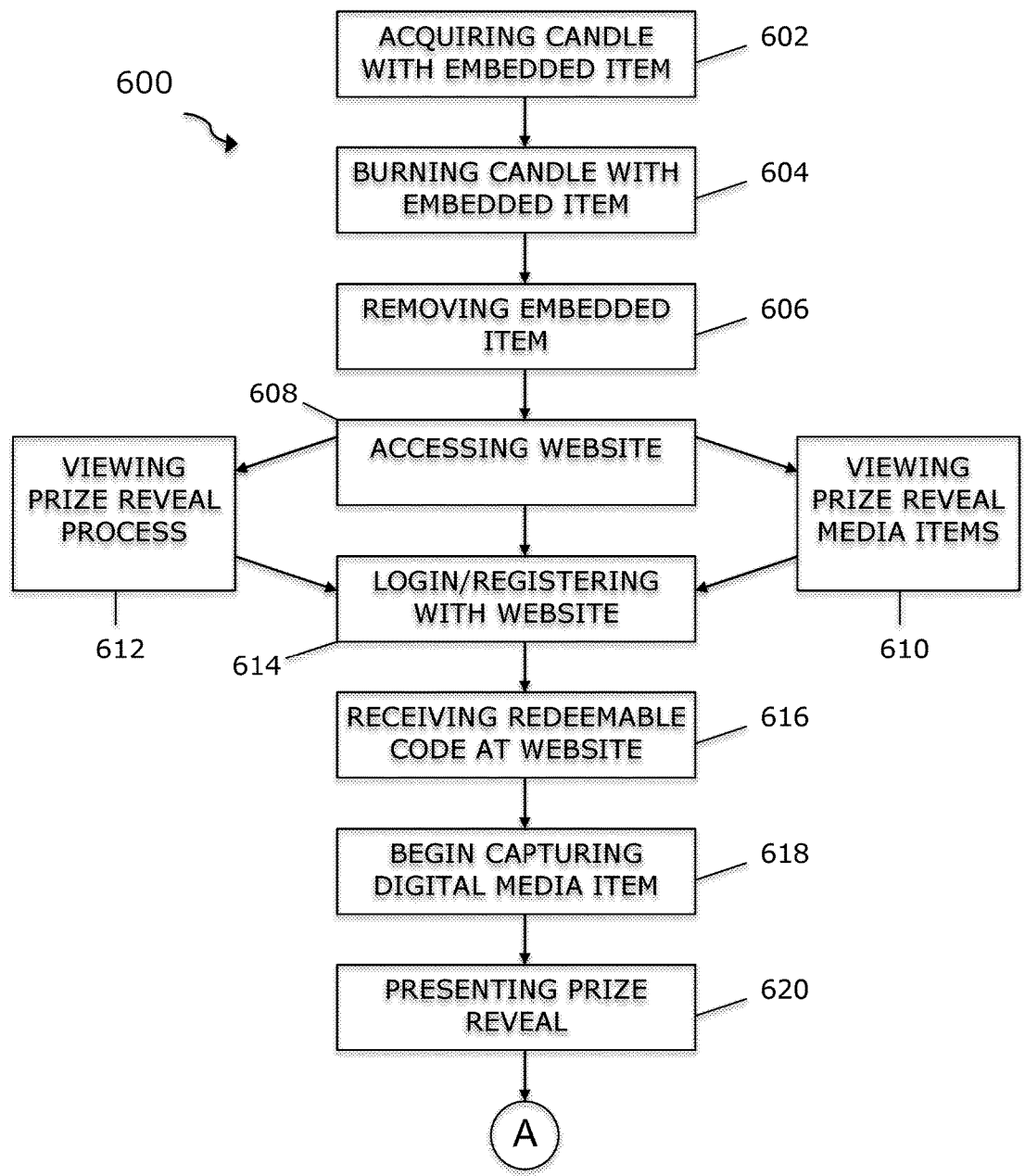
FIG. 6 illustrates an example method for revealing a prize according to an embodiment of the subject matter described herein.

FIG. 6 illustrates an example method 600 for revealing a prize. Method 600 can begin at step 602. At step 602 a candle with an embedded item can be acquired (e.g., a user can purchase or be gifted a candle with an embedded item). After a user has acquired a candle at step 602, the method can proceed to step 604. At step 604, the acquired candle can be burned. When the acquired candle has been burned to a predetermined level (e.g., when the embedded item is uncovered or accessible) the method can proceed to step 606. At step 606, the user can remove the embedded item from the candle. For example, the user can remove pouch containing a ring and a token with a redeemable code. In other embodiments, the embedded item can be a single item (e.g., a token with a redeemable code with or with the pouch). When the user has removed the embedded item from the candle at step 606, the method 600 can proceed to step 608.

At step 608, the user can access server 502 by a user device 508A-C. For example, the user can access a website that is served by server 502. When the user has accessed server 502 at step 608 the method can proceed to step 610 or step 612. At step 610, the user can view digital media items of prize reveals (e.g., digital videos and digital photographs). At step 612 the user can view how the prize reveal process works. For example, the ring reveal process can include instructions on how to enter a redeemable code, the prize reveal, and instructions on how to claim a prize (when won). After the user has accessed the server, viewed digital media items, or view the prize reveal process the method 600 can proceed to step 614.

At step 614, the user can login or register with the server 502. For example, when the user is already registered, the user can enter a username and password to access the website. When the user is not registered, the user can register by entering personal information (e.g., name, address, email address, username, password etc.). When a user has successfully registered and/or logged into the server 502 the method 600 can proceed to step 616.

At step 616, the user can submit the redeemable code at server 502 (e.g., server 502 can host a website where the redeemable code can be entered and submitted). In response to receiving the redeemable code, server 502 can determine an associated value to the redeemable code (e.g., from database 504). In other embodiments, the redeemable code can be received at server 502 by SMS, e-mail, by social media platform, by telephone, by smartphone app, or any other way electronic data can be transmitted and received at server 502. When the user has submitted the redeemable code the method 600 can proceed to step 618.

At step 618, the server 502 can request the user select a digital media capture device (e.g., web camera, front camera, rear camera, etc.) and begin capturing a digital media item. For example, the user of user device 508A-C (e.g., smartphone) can provide the website, served by server 502, access to the front camera of user device 508A-C. In response to the user selecting a digital media capture device, server 502 can begin capturing digital media items (e.g., digital video, digital photographs, etc.) captured during the prize reveal. When the server 502 receives a selection and begins capturing a digital media item, the method 600 can proceed to step 620.

At step 620, the server 502 can present a prize reveal page (e.g., a spinner). The server 502 can receive a digital media item (e.g., real-time or delayed) from the user device 508A-C. The server 502 can transmit to the user device 508A-C the value associated with the redeemable code. In one embodiment, the value can be received and rendered by the user device 508A-C as a spinner (e.g., a number of different potential values of the redeemable item). After a predetermined amount of time (e.g., 3 seconds, 5 seconds, 7 seconds, etc.) the value associated with the redeemable item can be rendered at the user device 508A-C and the digital media item captured during the predetermined amount of time transmitted to server 502. In some embodiments, the predetermined amount of time can be different for rendering the value and capturing the digital media item. In another embodiment, the value can be received at the user device 508A-C and rendered immediately (e.g., presenting the user with the value associated with the redeemable item immediately). When the value has been transmitted from the server 502 to the user device 508A-C the method 600 can proceed to either method 700 or method 800.

Figure 7:
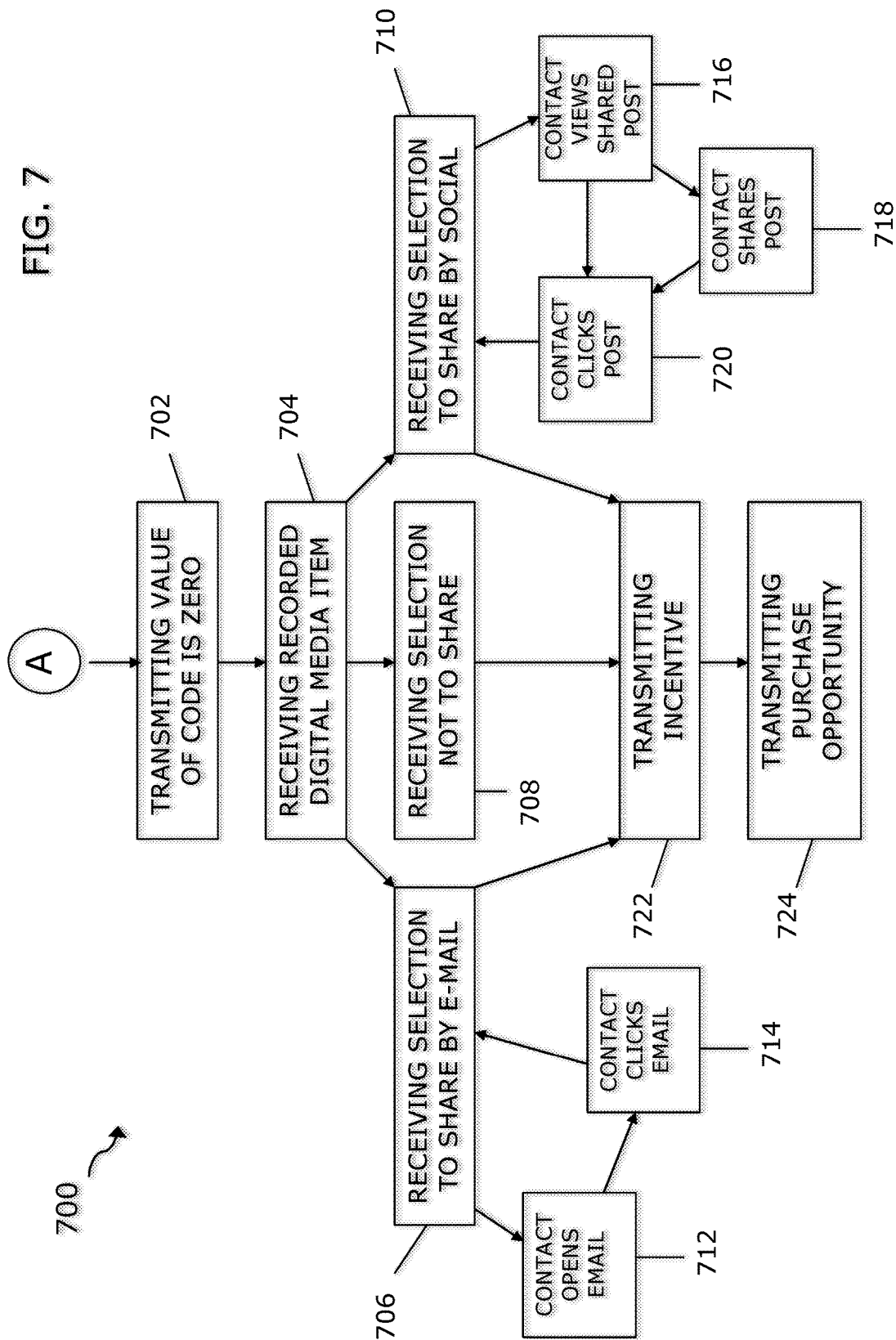
FIG. 7 illustrates an example method for revealing a prize is not won according to an embodiment of the subject matter described herein.

FIG. 7 illustrates an example method 700 for revealing a prize is not won. Method 700 can begin at step 702, which can be continued from step 620 of method 600. At step 702, the server 502 can transmit to user device 508A-C that the value of the embedded code is zero (e.g., has no monetary value). The value of the embedded code can be rendered at the user device 508A-C (e.g., that the value is zero and the user is not a winner). In some embodiments, the predetermined amount of time can be less when the value of the embedded code is zero. In other embodiments, the predetermined amount of time is zero and the value is rendered immediately upon receiving the transmission from server 504. When the server 504 transmits the value to the user device 508A-C the method 700 can proceed to step 704.

At step 704, the server 502 can receive the recorded digital media item. In some embodiments, server 502 can also receive a user preference to share the recorded digital media item (e.g., by e-mail, on a social media platform, etc.). In other embodiments, the user preference can be to not share the recorded digital media item. In some embodiments, when the value of the embedded item is zero, the recorded digital media item can be shorter than when the value of the embedded item is greater than zero (e.g., a digital video can be 5 seconds when value is zero and 10 seconds when value is greater than zero). When the recorded digital media item and the user preference is received at server 502 the method 700 can proceed to step 706, 708 or 710 based on the received user preference.

At step 706, the server 502 can receive a user preference to share the digital media item by e-mail. For example, the server 502 can receive from the user device 508A-C a selection to share the digital media item and one or more e-mail address. In response to receiving the selection and the one or more e-mail address, the server 502 can transmit by e-mail the digital media item to the provided e-mail addresses. In other embodiments, server 502 can create a draft e-mail to provide the user device 508A-C. The user of user device 508A-C can transmit the email (e.g., the draft email can be created within a third-party email service). In other embodiments, the user can be provided a link to the digital media item. The user can then e-mail the link. In other embodiments, the user can be provided with an incentive (at step 722) for sharing the digital media item (e.g., coupons, vouchers, etc.). After the e-mail has been transmitted, the method 700 can proceed to step 712 or step 722.

At step 712, the e-mail recipient can view the e-mail including the digital media item. At step 714, in response to viewing the e-mail, the e-mail recipient can be provided an incentive (at step 722) for viewing the digital media item. For example, the e-mail recipient can be provided coupon for viewing the digital media item. In other embodiments, the e-mail recipient can be provided a link to the digital media item. In response to the user clicking the link, to view the digital media item, an incentive (e.g., coupon, voucher, etc.) can be provided. For example, when the user views the digital media item the user can receive a coupon for a discount off of a future purchase. After the user has clicked through and viewed the e-mail the method 700 can proceed to step 722.

At step 710, the server 502 can receive a user preference to share the digital media item by social media platform. For example, the server 502 can receive from the user device 508A-C a selection to share the digital media item and access to a social media platform (e.g., login credentials). In response to receiving the selection and access to the social media platform, the server 502 can access the social media platform and upload the digital media item (e.g., post the digital video/photograph to the social media platform). In other embodiments, server 502 can create a draft post to the social media platform for approval by the user. The user of user device 508A-C can then approve the post for upload to the social media platform. In other embodiments, the user can be provided a link to the digital media item. The user can then post the link on a social media platform. In other embodiments, the user can be provided with an incentive (at step 722) for sharing the digital media item (e.g., coupons, vouchers, etc.). After the digital media item has been has been uploaded to the social media platform, the method 700 can proceed to step 716 or step 722.

At step 716, a social media platform contact (e.g., friend of the user on the social media platform) can view the uploaded digital media item (e.g., the post of the digital media item on the social media platform). At step 718, in response to viewing digital media item on the social media platform, the contact can share the uploaded digital media item (e.g., share the post to the friend's contacts). In response to sharing the uploaded digital media item the contact can be provide with an incentive at step 722 (e.g., coupon, voucher, etc.). For example, the contact can be provided coupon for sharing the uploaded digital media item. At step 720, the contact can click through the uploaded digital media item (e.g., view the digital media item uploaded to the social media platform). In response to clicking through the uploaded digital media item the contact can be provide with an incentive at step 722 (e.g., coupon, voucher, etc.). For example, the contact can be provided coupon for clicking through (i.e., viewing) the uploaded digital media item. In other embodiments, the contact can be provided a link to the digital media item. In response to the user clicking through the link, to view the digital media item, an incentive (e.g., coupon, voucher, etc.) can be provided. For example, when the user views the digital media item the user can receive a coupon for a discount off of a future purchase. After the contact has shared or clicked through the uploaded digital media item, the method 700 can proceed to step 722.

At step 708, the server 502 can receive a user preference that the user does not want to share the digital media item. For example, the user of the user device 508A-C can choose to not share the digital media item by email, social media platform, or any other platform for sharing digital media items. In some embodiments, in response to server 502 receiving a selection to not share the digital media item, the server 502 can determine to not provide the user device 508A-C with an incentive (e.g., coupon, voucher, etc.). In other embodiments, in response to server 502 receiving a selection to not share the digital media item, the server 502 can provide the user device 508A-C with an incentive (e.g., coupon, voucher, etc.). When the server 502 receives a user preference the method 700 can proceed to step 722 or 724.

At step 722, the server 502 can transmit to the user device 508A-C an incentive. For example, the server 502 can transmit a coupon, voucher, or other incentive to the user device 508A-C. In some embodiments, the server 502 can transmit the incentive by rendering on a website, by e-mail, social media platform, or rendering on a display of the user device 508A-C. When the user has been provided an incentive the method 700 can proceed to step 724.

At step 724, the server 502 can transmit to the user devices 508A-C an opportunity to purchase a candle with an embedded item using the incentive from step 722. For example, server 502 can direct the user device 508A-C to a website offering the candles with embedded items for purchase. When the server 502 has transmitted an opportunity to purchase to the user devices 508A-C the method 700 can end.

Figure 8A:
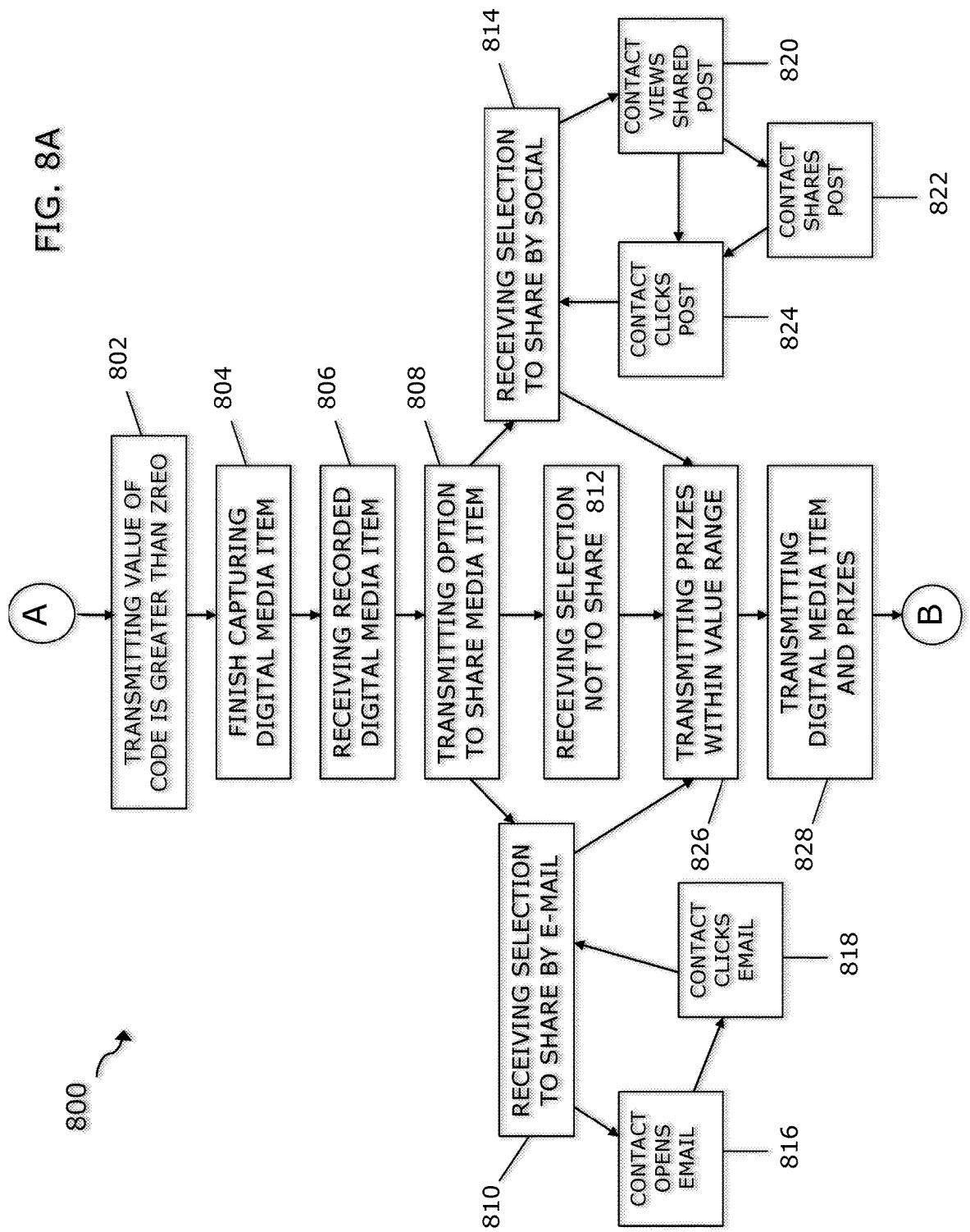
FIG. 8A and FIG. 8B illustrate an example method for revealing a prize is won according to an embodiment of the subject matter described herein.
Figure 8B:
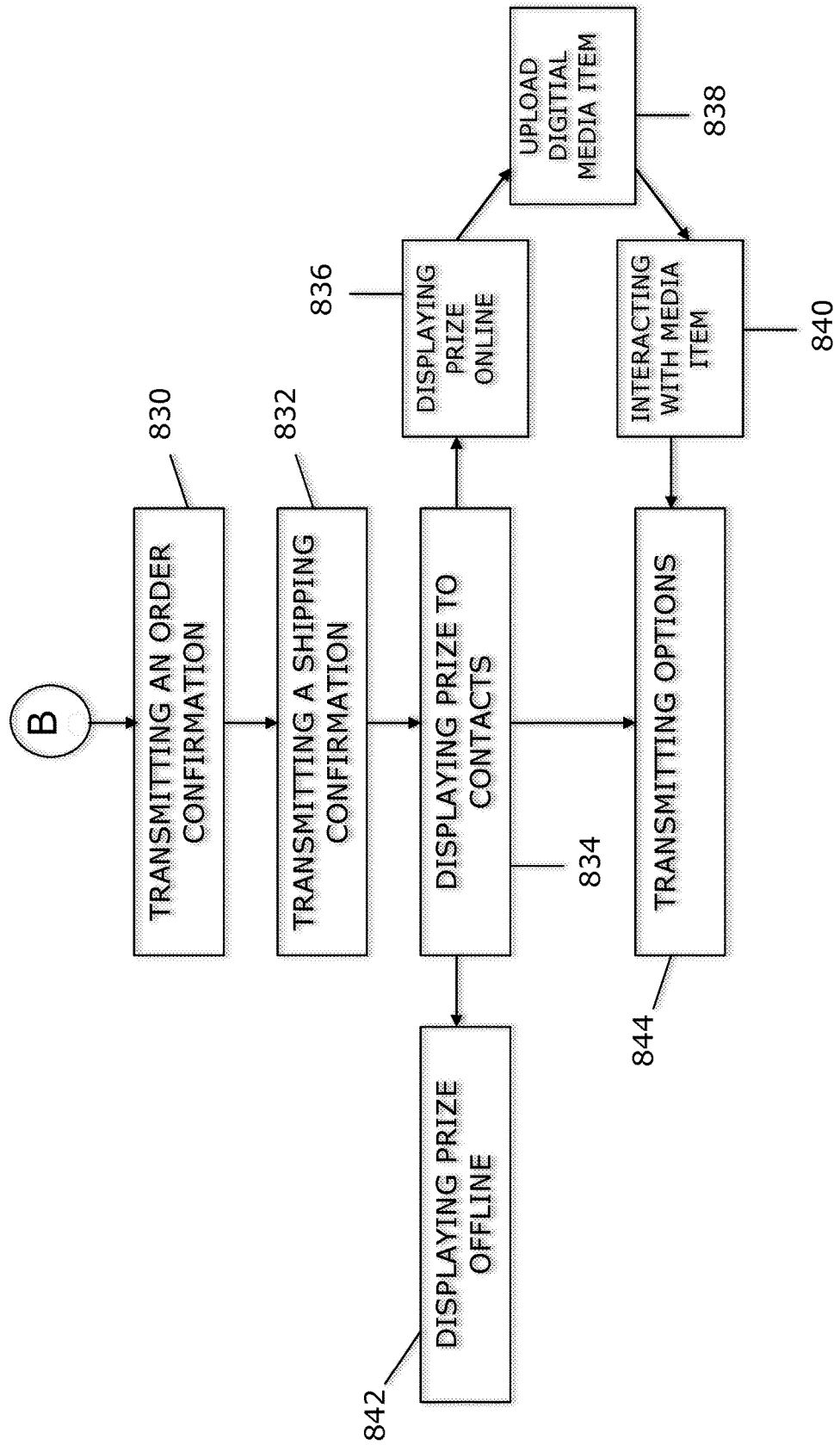

FIG. 8A and FIG. 8B illustrate an example method 800 for revealing a prize is won. Method 800 can begin at step 802, which can be continued from step 620 of method 600. At step 802, the server 502 can transmit to user device 508A-C that the value of the embedded code greater zero (e.g., $100, $500, $1000, $5000, etc.). The value of the embedded code can be rendered at the user device 508A-C (e.g., that the value is greater than zero and the user is a winner). In some embodiments, the predetermined amount of time can be greater when the value of the embedded code is greater than zero. In other embodiments, the predetermined amount of time is zero and the value is rendered immediately upon receiving the transmission from server 502. When the server 502 transmits the value to the user device 508A-C the method 800 can proceed to step 804.

As step 804, the user device 508A-C can finish capturing a digital media item (e.g., a digital video, digital photograph, etc.) of the user's reaction to winning at step 802 (which began at step 618). User device 508A-C can be coupled to a camera (e.g., enable to record digital video, digital photographs, and audio). The capture of the digital media item can be for a predetermined amount of time (e.g., 3 seconds, 5, seconds, 7 seconds, 10 seconds, etc.). When the user device 508A-C finishes capturing the digital media item the method 800 can proceed to step 806.

At step 806, the server 502 can receive the digital media item (e.g., a digital video, digital photograph, etc.) from the user device 508A-C. The server 502 can store the digital media item in database 504. When the server 502 has received the digital media item the method 800 can proceed to step 808.

At step 808, server 502 can transmit to user device 508A-C an option to share the recorded digital media item. In some embodiments, the option can be to share by e-mail. In other embodiments, the option can be to share by social media platform. In other embodiments, the option can be to not share the recorded digital media item. In response to a user of user device 508A-C selecting an option, server 502 can receive the user selection to share the recorded digital media item (e.g., by e-mail, on a social media platform, not share, etc.). When the user selection is received at server 502 the method 800 can proceed to step 810, 812 or 814 based on the received user selection.

At step 810, the server 502 can receive a selection (e.g., user preference) to share the digital media item by e-mail. For example, the server 502 can receive from the user device 508A-C a selection to share the digital media item and one or more e-mail address. In response to receiving the selection and the one or more e-mail address, the server 502 can transmit by e-mail the digital media item to the provided e-mail addresses. In other embodiments, server 502 can create a draft e-mail to provide the user device 508A-C. The user of user device 508A-C can transmit the email (e.g., the draft email can be created within a third-party email service). In other embodiments, the user can be provided a link to the digital media item. The user can then e-mail the link. In other embodiments, the user can be provided with an incentive for sharing the digital media item (e.g., coupons, vouchers, etc.). After the e-mail has been transmitted, the method can proceed to step 816 or step 826.

At step 816, the e-mail recipient can view the e-mail including the digital media item. At step 818, in response to viewing the e-mail, the e-mail recipient, in some embodiments, can be provided an incentive for viewing the digital media item. For example, the e-mail recipient can be provided coupon for viewing the digital media item. In other embodiments, the e-mail recipient can be provided a link to the digital media item. In response to the user clicking the link, to view the digital media item, an incentive (e.g., coupon, voucher, etc.) can be provided. For example, when the user views the digital media item the user can receive a coupon for a discount off of a future purchase. In other embodiments, the user is not provided an incentive. After the user has clicked through and viewed the e-mail the method 800 can proceed to step 826.

At step 814, the server 502 can receive a selection (e.g., user preference) to share the digital media item by social media platform. For example, the server 502 can receive from the user device 508A-C a selection to share the digital media item and access to a social media platform (e.g., login credentials). In response to receiving the selection and access to the social media platform, the server 502 can access the social media platform and upload the digital media item (e.g., post the digital video/photograph to the social media platform). In other embodiments, server 502 can create a draft post to the social media platform for approval by the user. The user of user device 508A-C can then approve the post for upload to the social media platform. In other embodiments, the user can be provided a link to the digital media item. The user can then post the link on a social media platform. In other embodiments, the user can be provided with an incentive for sharing the digital media item (e.g., coupons, vouchers, etc.). After the digital media item has been has been uploaded to the social media platform, the method 800 can proceed to step 820 or step 826.

At step 820, a social media platform contact (e.g., friend of the user on the social media platform) can view the uploaded digital media item (e.g., the post of the digital media item on the social media platform). At step 822, in response to viewing digital media item on the social media platform, the contact can share the uploaded digital media item (e.g., share the post to the friend's contacts). In response to sharing the uploaded digital media item the contact can be provide with an incentive (e.g., coupon, voucher, etc.). For example, the contact can be provided a coupon for sharing the uploaded digital media item. At step 824, the contact can click through the uploaded digital media item (e.g., view the digital media item uploaded to the social media platform). In response to clicking through the uploaded digital media item the contact can be provide with an incentive (e.g., coupon, voucher, etc.). For example, the contact can be provided a coupon for clicking through (i.e., viewing) the uploaded digital media item. In other embodiments, the contact can be provided a link to the digital media item. In response to the user clicking through the link, to view the digital media item, an incentive (e.g., coupon, voucher, etc.) can be provided. For example, when the user views the digital media item the user can receive a coupon for a discount off of a future purchase. After the contact has shared or clicked through the uploaded digital media item, the method 800 can proceed to step 826.

At step 812, the server 502 can receive a selection (e.g., user preference) that the user does not want to share the digital media item. For example, the user of the user device 508A-C can choose not to share the digital media item by email, social media platform, or any other platform for sharing digital media items. In some embodiments, in response to server 502 receiving a selection not to share the digital media item, the server can determine not to provide the user device 508A-C with an incentive (e.g., coupon, voucher, etc.). In other embodiments, in response to server 502 receiving a selection not to share the digital media item, the server can provide the user device 508A-C with an incentive (e.g., coupon, voucher, etc.). When the server 502 receives a selection the method 800 can proceed to step 826.

At step 826, the server 502 can transmit one or more prizes within the value determined at step 802. For example, if the redeemable code was valued at $500 the server 502 can transmit (i.e., serve a website) to the user device 508A-C, a listing of rings appraised at $500. In some embodiments, the listings also include different sizes and styles. In some embodiments, the user can select between different types of jewelry. In other embodiments, the user can receive government currency equal to the value determined in step 802. In other embodiments, the user can receive government currency, less than the value determined in step 802, instead of selecting a prize. In response to transmitting the one or more prizes, server 502 can receive a selection of a prize from user device 508A-C. When the server 502 has transmitted the one or more prizes or received the selection of the prize, the method 800 can proceed to step 828 or step 830.

At step 828, the server 502 can transmit to the user device 508A-C the recorded digital media item. For example, the user device 508A-C can receive an e-mail with a link to the recorded digital media item. In some embodiments, the server 502 can also transmit, when the server has not yet received the selection of a prize, the prizes within the value range as described in step 826. When the digital media item has been transmitted the method 800 can proceed to step 830.

At step 830, the server 502 can transmit an order confirmation to the user. For example, server 502 can transmit an order confirmation (e.g., by email, social media platform, SMS, etc.) including the selection of the prize in step 826 or 828. The user can view the order confirmation by user device 508A-C. In some embodiments, the confirmation can include the style and size of the selected prize. When the confirmation has been transmitted the method 800 can proceed to step 832.

At step 832, the server 502 can transmit a shipping confirmation to the user. For example, server 502 can transmit a shipping confirmation (e.g., by email, social media platform, SMS, etc.) including the shipment date, a unique tracking number, estimated arrival date, carrier, etc. The user can view the shipping confirmation by user device 508A-C. When shipping confirmation has been transmitted the method 800 can proceed to step 834.

At step 834, the user can display prizes received. For example, the prize received could be the prize embedded in the candle or the prize selected from the value of the embedded item. The user can display the prize in-person (e.g., offline) at step 842. The user can display the prize online at step 836. When the user decides to display the prize online, the method 800 can proceed to step 838 or step 844.

At step 838, the user can upload a digital media item with reference to the candle with an embedded item. For example, the digital media item can be a digital photograph or digital video of the prize. The digital media item can include a reference to the candle with an embedded item (e.g., hash tags, links, etc.). In some embodiments, the digital media item can be different than the digital media item in steps 804 and 806. In other embodiments, the digital media item can be the digital media item in steps 804 and 806. In some embodiments, the digital media item can be uploaded to a social media platform. In other embodiments, the digital media item can be transmitted directly to contacts (e.g., by e-mail, SMS, messaging, or any other way to transmitting a digital media item). When the digital media item has been shared the method 800 can proceed to step 840.

At step 840, contacts (e.g., friends) of the user can discover the candles with an embedded item by interacting with the reference. For example, when a contact logs onto the social media platform, the contact can view the digital media item shared by the user and the reference to the candle with an embedded item. Upon viewing the digital media item and reference, the contact can then discover the candle with embedded items. For example, by clicking the reference (e.g., link or hash tag). When the user has interacted with the reference the method 800 can proceed to step 844.

At step 844, the contact can view and purchase candles with embedded items. For example, the reference from 840 can be linked to a webpage. By interacting with the link, server 502 can serve the contact's user device 508A-C the website, which can in turn render the webpage on the display of the user device. The website can include different candles with embedded items to purchase. The contact, by interacting with the reference can view and purchase candles including embedded items. The method 800 can then end.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure may be provided as a computer program product including a non-transitory machine-readable storage medium having stored thereon instructions (in compressed or uncompressed form) that may be used to program a computer (or other electronic device)

to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for revealing a prize, the method comprising:
embedding a redeemable code in a candle, the redeemable code accessible upon burning at least a portion of the candle;
receiving, at a server, the redeemable code;
determining, at the server, a monetary value associated with the redeemable code; and
transmitting, from the server, the value associated with the redeemable code.

2. The method of claim 1, further comprising:
receiving, at the server, a digital media item; and
providing access, from the server, to the digital media item to an online community.

3. The method of claim 2, wherein the digital media item is a digital photograph.

4. The method of claim 2, wherein the digital media item is a digital video.

5. The method of claim 1, the determining further comprising:
transmitting, from the server, a spinner, wherein the spinner randomly alternates between a plurality of values associated with the redeemable code.

6. The method of claim 1, further comprising:
receiving, at the server, a selection of an item of jewelry equal to the monetary value associated with the redeemable code.

7. The method of claim 6, wherein the item of jewelry is a ring.

8. The method of claim 7, wherein the selection is a size of the ring.

9. The method of claim 7, wherein the selection is a style of the ring.

10. The method of claim 1, wherein, the candle also included an embedded prize.

11. The method of claim 10, wherein the embedded prize is a ring.

12. A computing system comprising:
a processor; and
a memory coupled to the processor to store computer-readable instructions, which when executed cause the processor to:
receive data representative of a candle-embedded code, the candle-embedded code accessible upon burning at least a portion of a candle;
determine a monetary value of the candle-embedded code based on the data representative of the candle-embedded code; and
transmit data representative of the monetary value.

13. The computing system recited in claim 12, wherein the monetary value represents a value of a prize embedded in the candle.

14. The computing system recited in claim 12, wherein the monetary value represents a value of a claimable prize separate from the candle.

15. The computing system recited in claim 12, further comprising additional instructions causing the processor to determine parameters of a video to be recorded corresponding with the monetary value of a prize.

16. The computing system recited in claim 12, further comprising additional instructions causing the processor to:
provide a digital media item to a server communicatively coupled to the computing device over the network; and
providing access, to the server, to share the digital media item to an online community.

17. The computing system recited in claim 16, wherein the digital media item is a digital photograph.

18. The computing system recited in claim 16, wherein the digital media item is a digital video.

19. The computing system recited in claim 12, further comprising additional instructions causing the processor to:
receive, over a network from a server, a spinner, wherein the spinner randomly alternates between a plurality of values associated with the candle-embedded code.

20. The computing system recited in claim 12, further comprising additional instructions causing the processor to transmit a selection of an item of jewelry equal to the monetary value associated with the candle-embedded code.

21. The computing system recited in claim 20, wherein the item of jewelry is a ring.

22. The computing system recited in claim 20, wherein the selection is a size of the ring.

23. The computing system recited in claim 20, wherein the selection is a style of the ring.

24. The computing system recited in claim 20, wherein, the candle also comprises an embedded prize.

25. The computing system recited in claim 20, wherein the embedded prize is a ring.

26. A candle comprising:
a body composed at least partial of wax; and
a redeemable code embedded in the body, wherein the redeemable code is accessible upon burning of the candle, the redeemable code associated with a monetary value, and the monetary value is determined by a server when the redeemable code is transmitted to the server.

27. The candle of claim 26, wherein the monetary value represents a value of a prize embedded in the candle.

28. The candle of claim 26, wherein the monetary value represents a value of a claimable prize separate from the candle.

* * * * *